United States Patent [19]
Blount et al.

[11] Patent Number: 5,960,209
[45] Date of Patent: *Sep. 28, 1999

[54] SCALEABLE DIGITAL SIGNAL PROCESSOR WITH PARALLEL ARCHITECTURE

[75] Inventors: Harold Blount; Alexander Tulai, both of Ottawa, Canada

[73] Assignee: Mitel Corporation, Kanata, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/613,331

[22] Filed: Mar. 11, 1996

[51] Int. Cl.⁶ ..................................... G06F 15/00
[52] U.S. Cl. ............................. 395/800.01; 395/800.35; 395/200.31
[58] Field of Search ......................... 395/800.01, 800.31, 395/800.35, 800.1, 200.31, 200.38, 200.05

[56] References Cited

U.S. PATENT DOCUMENTS

| | | |
|---|---|---|
| 4,862,407 | 8/1989 | Fette et al. .......................... 395/800.35 |
| 5,187,791 | 2/1993 | Baum . |
| 5,189,598 | 2/1993 | Bolan et al. . |
| 5,239,654 | 8/1993 | Ing-Simmons . |
| 5,488,693 | 1/1996 | Houck et al. ....................... 395/200.05 |

FOREIGN PATENT DOCUMENTS

| | | |
|---|---|---|
| 0473 452 | 3/1992 | European Pat. Off. . |
| 94 27216 | 11/1994 | WIPO . |

OTHER PUBLICATIONS

Dual–DSP System For Signal and Image Processing —K. Rajan, K.S. Sangunni and J. Ramakrishna —2407 Microprocessors and Microsystems—17 (1993) Nov. , No. 9, Jordan Hill,, Oxford, G.B.

Primary Examiner—Eric Coleman
Assistant Examiner—Mackly Monestime
Attorney, Agent, or Firm—Mark & Clerk

[57] ABSTRACT

A distributed architecture parallel processing apparatus, includes a central microprocessor having at least one external interface connected to a similar interface of a neighboring parallel processor. The processors exchange data and control signals through the interfaces to cooperatively share in the execution of a program. An inter-processor status register in each processor maintains the current status of the processors.

23 Claims, 4 Drawing Sheets

SCALEABLE DIGITAL SIGNAL PROCESSOR WITH PARALLEL ARCHITECTURE

BACKGROUND OF THE INVENTION

This invention relates to digital processing apparatus, and more particularly to a digital processing apparatus having a distributed architecture.

A classical Digital Signal Processor (DSP) has two major parts, namely a core architecture and the peripherals.

The major blocks of the core architecture are:
Program/Data Memory
Arithmetic/Logic Unit (ALU)
Multiplier/Accumulator (MAC)
Barrel Shifter (BS)
Data Address Generator (DAG)
Program Address Generator (PAG)
Registers (used to hold intermediary results, addresses, and speed up access to the previous five blocks)
Buses Some of the peripheral blocks are:
Serial Port(s)
Host Interface Port (parallel port)
Timer(s)

Somewhere between these two blocks are:
DMA controller
Interrupt(s) controller

Various DSPs may use distinct ALU, MAC and BS computational blocks or may blend them into multifunctional units.

The new generation of DSPs take advantage of:
newer technologies allowing faster clocking of old architectures and consequently higher processing power
faster memories that allow improvements in the internal architecture of various blocks
multiple internal buses
new peripherals One of the common problems associated with the traditional DSP architectures is the uneven loading of the processors in a multiprocessor design. To cope with this problem, more recently, new DSP architectures have been proposed and implemented that have parallel processing capabilities.

At the heart of their design is the concept of inter-processor communication via external interface ports, globally shared memory, and shared buses. The complexity of these designs, however, translates into extremely high cost IC implementations.

Parallel Computing (PC) increases processing power by permitting parallel processing at the routine (task) level. When a program has to execute two different routines that are independent at the data level (i.e. the data written by one routine is not read by the other routine), the two routines can be executed in parallel. This is referred to herein as macro parallelism.

Congestion can also occur at the instruction level. When a program has to execute a sequence of instructions that are independent, at data level, these instructions could be executed in parallel. Executing these instructions in parallel (herein referred to as micro parallelism) on the same processor, however, would require multiple buses and instruction words large enough to handle multiple operands.

An object of the invention is alleviate this problem.

SUMMARY OF THE INVENTION

According to the present invention there is provided digital processing apparatus comprising a microprocessor, said microprocessor comprising at least one external interface for connection to a respective parallel like microprocessor having a similar interface; a plurality of internal registers including a respective internal register shareable with each said parallel like microprocessor, an internal bus accessing said internal registers, and an external bus connectable to each said parallel like microprocessor through said at least one external interface to permit the exchange of data said control signals; a multiplexer connecting said internal bus and the or each said external bus to the or each said shareable internal register so that said microprocessor and the or each said external like microprocessor can co-operatively share in the execution of a single instruction represented by a large instruction word; and an inter-processor status register for maintaining the current status of said microprocessor and said least one parallel like microprocessor.

The invention handles macro parallelism by allowing a processor to start a task (and be notified on its completion) on a neighboring parallel processor.

The invention can also handle parallel processing of single instruction words (micro parallelism) without the need for multiple buses and the like. Instead of requiring a complex processor, the invention locks together multiple simpler processors to achieve a similar result, and at the same time obtain the benefit of the power of multiple processing units. When multiple processors are locked together, the instructions they execute can be seen as the equal length segments of a Large Instruction Word (LIW). Depending on how many processor are locked together, the length of the Large Instruction Word could vary.

The invention thus permits the handling of micro parallelism through LIW, as well as macro parallelism through Parallel Computing.

The invention thus employs a processor interface and changes to the architecture of a DSP that make both Parallel Computing and Large Instruction Word possible. The new distributed processing architecture is particularly suited for the case when the processors share the silicon space of a single integrated circuit.

The invention also provides a distributed architecture parallel processing apparatus, comprising a microprocessor having at least one external interface connected to a similar interface of a neighboring parallel processor, said processors exchanging data and control signals through said interfaces to cooperatively share in the execution of a program; and an inter-processor status register in each processor for maintaining the current status of said processors.

The invention still further provides a method of executing a comprising the steps of providing an least two parallel processors; interconnecting said processors through an external interface so that they can exchange data and control signals to cooperatively share in the execution of a program; providing internal registers in each said processor, at least one said register being shareable with a said parallel processor; providing in each said processor an internal bus and an external bus connected to a said parallel processor through said interface; permitting two said processors to access said shareable register by multiplexing said internal and external buses so that said parallel processors can co-operatively share in the execution of a single instruction represented by a large instruction word; and maintaining the status of the cooperating processors in a inter-processor status register provided therein.

It should be understood that each processor in a multi-processor configuration has the potential to be a master/and or slave. For example, if processor A starts a job on processor B, A and B are in a master-slave relationship. However, B can "sub-contract" some part of the job to C, in which case B and C are in a master-slave relationship. B is a slave to A, but a master to C. At a different moment in time, which is software dependent, this relationship can totally reverse itself.

BRIEF DESCRIPTION OF THE DRAWINGS

The invention will now be described in more detail, by way of example, only with reference to the accompanying drawings, in which:

FIG. 6 is a more detailed diagram explaining the architecture of a processor in accordance with the invention.

DESCRIPTION OF THE PREFERRED EMBODIMENTS

Figure 1:
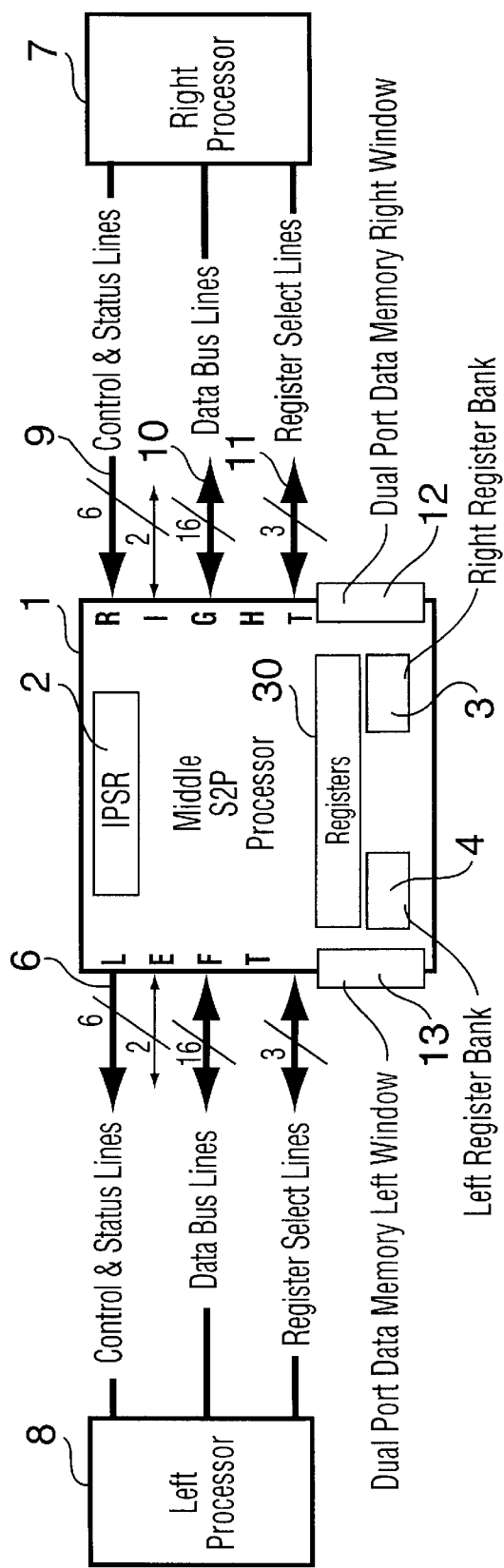
FIG. 1 is a diagrammatic illustration of a microprocessor with an external interface in accordance with the invention.

Referring to FIG. 1, the central digital signal processor 1 includes a program/data memory; an arithmetic/logic unit (ALU); a multiplier/accumulator (MAC); a barrel shifter (BS); a data address generator (DAG); a program address generator (PAG); registers for holding intermediate results, addresses, and speed up access to the previous five blocks); and buses. As these components are conventional, they are not illustrated in the drawings and will not be described in detail.

Figure 2:
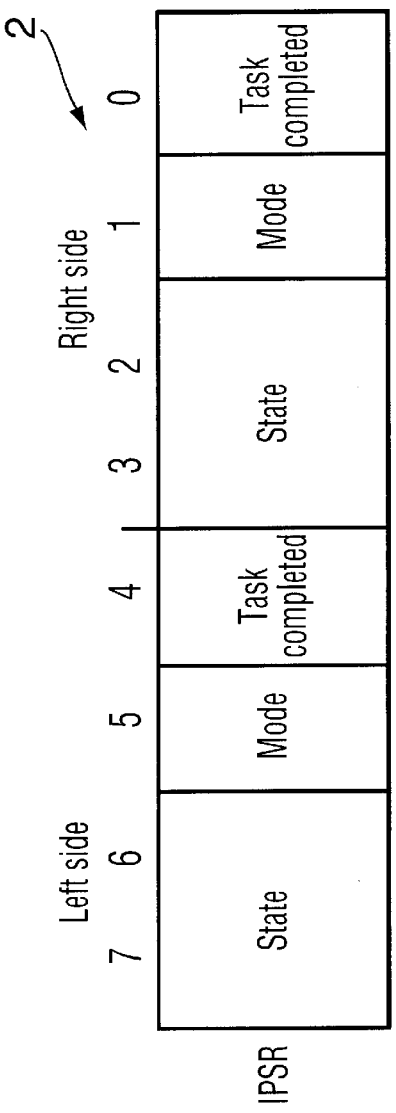
FIG. 2 shows the organization of the inter-processor status register.

The processor 1 also includes an interprocessor register 2 (IPSR) described in more detail with reference to FIG. 2 and right and left register banks 3, 4, and central register 130. Right and left dual Port data memory 12, 13 provides a memory window accessible both to the central processor and the associated neighboring parallel processor.

The central processor 1 has right and left external interfaces 5, 6 for communicating with respective parallel processors 7, 8 in a symmetrical scheme, referred to as the Left processor and Right processor. The external interface is presented in FIG. 1. The Left and Right Processors are similar microprocessors to the central processor and are not illustrated in detail.

In the above scheme, the processor 1 is viewed as the 'Middle processor', having a similar left and a right neighbor presenting and controlling an identical interface.

Figure 3:
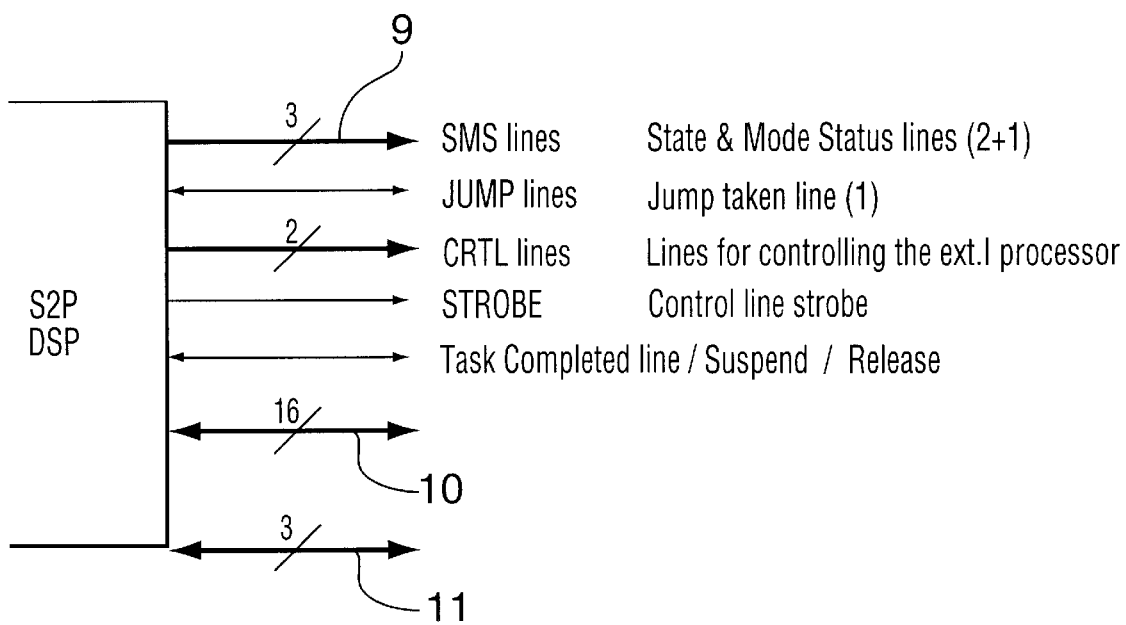
FIG. 3 shows the control and status lines of the interface in more detail.

The external signals are separated in three main groups of signals 9, 10, 11 as shown in more detail in FIG. 3, namely the Control and Status Lines—eight lines, (6 outgoing and two bi-directional as shown in more detail FIG. 3 for details); bi-directional Data Bus Lines; the number of which is implementation dependent (16 in one embodiment); and bi-directional Register Select Lines, the number of which is implementation dependent (3 in one embodiment).

As shown in FIG. 1, two adjacent processors share data through a dual port RAM 12, 13, mapped in the data memory space of both processors, and via two banks of dual port registers (accessed from both internal Data Bus and external Left or Right Data Bus), each processor with its own set (see FIG. 3).

The central processor has an Inter-Processor Status register (IPSR) 2 that describes its state and functional mode with respect to the left and right processors. The IPSR register is shown in FIG. 2.

There are four possible states and thus two bits needed to describe them:

1. Independent
2. Parallel Computing (PC)
3. Large Instruction Word (LIW)
4. Suspended There are 2 possible modes (1 bit needed):

Master

Slave

A central processor can be in a Master mode with respect to both neighboring processors, or a Master mode with respect to one and a Slave mode with respect to the other, but it can never be in a Slave mode with respect to both (left and right) processors simultaneously.

Any central processor can interrupt a left or/and right them (status and interface line condition permitting) and bring it/them into a Master-Slave mode in which the Slave does work on behalf of the Master.

Depending on the state and mode bits in the status register 2, a processor has various access rights to the dual port data memory window and to the register bank of the neighboring processor(s). Table 1 describes the access rights and the functionality of a processor based on the state and mode bits configuration. In Table 1, the 'Symmetry state' column is used to label those situations where a symmetric situation could occur.

TABLE 1

Access rights and functionality based on status bits.

| Left Side Bits | | Right Side Bits | | | | Symm. |
|---|---|---|---|---|---|---|
| State | Mode | State | Mode | Access | Executed programs | state |
| Indep. | Master | Indep. | Master | Restricted to its own regs. and data space | Executes its own job. | NO |
| Indep. | Master | PC | Master | Restricted to its own regs. and data space | Executes its own job. Started job on right processor | YES |
| Indep. | Master | PC | Slave | Own regs. and data space + RDMWA[1] | Executes job on behalf of Right proc. | YES |

TABLE 1-continued

Access rights and functionality based on status bits.

| Left Side Bits | | Right Side Bits | | | | Symm. |
|---|---|---|---|---|---|---|
| State | Mode | State | Mode | Access | Executed programs | state |
| Indep. | Master | LIW | Master | Own regs. and data + RRA2 + RDMWA | Executes own job locking Right proc. | YES |
| Indep. | Master | LIW | Slave | Own regs. and data + RRA + RDMWA | Executes locked by Right proc | YES |
| Indep. | Master | Suspend | Slave | Own regs. and data + RRA + RDMWA | PC is frozen while NOPs are executed | YES |
| PC | Master | PC | Master | Restricted to its own regs. and data space | Executes its own job. Started II jobs on left & right processors. | NO |
| PC | Master | PC | Slave | Own regs. and data + RDMWA | Executes job on behalf of Right proc. Started II job on left. | YES |
| PC | Master | LIW | Master | Own regs. and data + RRA | Executes its own job locking Right proc. Started job on Left proc. | YES |
| PC | Master | LIW | Slave | Own regs. and data + RRA + RDMWA | Executes locked by Right proc. Started job on Left proc. | YES |
| PC | Master | Suspend | Slave | Own regs. and data + RRA + RDMWA | Started job on Left proc. Suspended while locked by right | YES |
| PC | Slave | LIW | Master | Own regs. and data + LDMWA + RRA | Executes job on behalf of Left proc. + locking Right proc. | YES |
| PC | Slave | Suspend | Master | Own regs. and data + LDMWA + RRA | Suspended while locking Right proc. Now executes ∥ job for Left processor. | YES |
| LIW | Master | LIW | Master | Own regs. and data + LRA3 + RRA | Executes its own job locking both Left and Right procs. | NO |
| LIW | Master | LIW | Slave | Own regs. and data + LRA + RRA + RDMWA | Executes on behalf of and locked by Right, locking Left. | YES |
| Suspend | Master | Suspend | Slave | Own regs. and data + LRA + RRA + RDMWA | While in the above state has received (and passed to Left) the Suspend command | YES |

[1]RDMWA — Right processor Data Memory Window Access
[2]RRA — Right processor Register Access
[3]LRA — Left processor Register Access The state and mode bits in the IPSR 2 uniquely determine the condition of the external interface status line. The mapping of the state and mode bits onto external status lines is given in Table 2.

TABLE 2

Internal status bits to external status lines mapping

| Left Side Bits | | Right Side Bits | | Left state lines | | Right state lines | | Symm. |
|---|---|---|---|---|---|---|---|---|
| State | Mode | State | Mode | State | Mode | State | Mode | states |
| Indep. | Master | Indep. | Master | Indep. | Master | Indep. | Master | NO |
| Indep. | Master | PC | Master | PC | Master | PC | Master | YES |
| Indep. | Master | PC | Slave | pC | Slave | PC | Slave | YES |
| Indep. | Master | LIW | Master | LIW | Master | LIW | Master | YES |
| Indep. | Master | LIW | Slave | LIW | Slave | LIW | Slave | YES |
| Indep. | Master | Suspend | Slave | Suspend | Slave | Suspend | Slave | YES |
| PC | Master | PC | Master | PC | Master | PC | Master | NO |
| PC | Master | PC | Slave | PC | Slave | PC | Slave | YES |
| PC | Master | LIW | Master | LIW | Master | LIW | Master | YES |
| PC | Master | LIW | Slave | LIW | Slave | LIW | Slave | YES |
| PC | Master | Suspend | Slave | Suspend | Slave | Suspend | Slave | YES |
| PC | Slave | LIW | Master | LIW | Slave | LIW | Slave | YES |
| PC | Slave | Suspend | Master | Suspend | Slave | Suspend | Slave | YES |
| LIW | Master | LIW | Master | LIW | Master | LIW | Master | NO |
| LIW | Master | LIW | Slave | LIW | Slave | LIW | Slave | YES |
| Suspend | Master | Suspend | Slave | Sus end | Slave | Suspend | Slave | YES |

The possible actions of a processor with respect to the left/right processors, based on its left/right status bits and external status lines and left/right processor status lines are given in Table 3.

TABLE 3

Possible actions of a processor based on its status bits and external status lines

| Right Side Bits | | Right Side Lines | | Right Status Lines | | Possible |
|---|---|---|---|---|---|---|
| State | Mode | State | Mode | State | Mode | actions |
| Indep. | Master | Indep. | Master | Indep. | Master | Force Right to PC |
|  |  | PC |  | PC |  | Force Right to LIW |
|  |  | LIW |  |  |  |  |
| Indep. | Master | Indep. | Master | LIW | Master | Force Right to PC |
|  |  | PC |  |  |  |  |
| Indep. | Master | PC | Slave | Indep. | Master | Force Right to PC |
|  |  |  |  | PC |  | Force Right to LIW |
| Indep. | Master | LIW | Slave | Indep. | Master | Force Right to PC |
|  |  |  |  | PC |  | Force Right to LIW |
| PC | Slave | PC | Slave | PC | Master | Report task comleted |
| LIW | Master | LIW | Master | LIW | Slave | Exit LIW state unlock |

As will be apparent, there are four possible states and two possible modes. From all eight possible combinations only one is invalid, (Independent, Slave) combination.

The two pairs of status bits in the IPSR 2 determine what is the relation of the processor with respect to the processor on that side. Only a combination of both sides status bits could determine the real state of the processor.

Whenever a processor enters a Slave mode, almost all its registers get saved, such that the work can be resumed when the Master mode is re-entered. This can occur quickly with the use of shadow registers in this embodiment.

The situation that arises in various valid combinations will now be described, although it will be apparent to one skilled in the art that other valid combinations are possible.

1. (Independent, Master)

A processor is in this state when the status bits on both sides of the IPSR 2 show it in this state. In this case the external status lines will show the same thing (see Table 2).

In this state a processor executes code on behalf of itself and can access only its own registers and data memory.

2. (Parallel Computing, Master)

When one side of the IPSR register 2 shows this configuration and the other side shows the Independent-Master case, the central processor 1 is in a Master-Slave relationship with the processor on that side, has already started a parallel task on the processor on that side, and can check on the state of that task by polling the corresponding Task Completed bit in IPSR 2 or by executing a Wait until Task Completed on Left/Right instruction. In this last case the processor will stay idle until the corresponding bit is set.

In this state the processor has the same access right as in (Independent, Master) state.

3. (Large Instruction Word, Master)

When one side of the IPSR register 2, shows this configuration (while the other side shows the Independent-Master case), the central processor 1 is in a Master-Slave relation with the processor on that side, and has already locked to that processor to so as to process Large Instruction Words in parallel. The processor that has been locked can, in turn lock to another one, and so on in cascade. Whenever the LIW-Master processor jumps as a result of a control instruction (conditional/unconditional branches or looping instructions,) the take-the-branch condition is passed as a signal through the interfaces to all the processors locked in the chain. In this way, synchronized jumps are ensured, making assisted loop executions possible. When the processor executes a Release Left/Right processor instruction, the locked processor becomes unlocked and the Master can enter a state dependent on the status bits on the other side of IPSR 2.

In this state, the processors have access not only to the dual port data memory window separating them from the Slave but also to the correspondent register bank of processor locked. The instruction set will be extended with instructions capable of accessing the left or right processor.

4. (Suspended, Master)

Only one side of a processor can show this combination of state and mode bits. However, the status bits on the opposite side of IPSR determine what the processor really does.

If the opposite status bits show (PC, Slave), the processor in fact is not suspended but is rather executing a parallel task forced by the processor on that side. Before being forced into a (PC, Slave) situation the processor was in a (LIW, Master) situation. When the switch occurred the processor had to suspend LIW activity itself and the processors locked up with it.

If the opposite status bits show (LIW, Slave), the processor is in fact suspended. In this situation the processor has frozen its own PC and executes NOP instructions. Before being in this state the processor was in a (LIW, Slave) situation with one of its sides and in a (LIW, Master) situation with the other side. The processor it has received a SUSPEND signal from the Slave side that it has past to the processor on the Master side. In this way, when the head of LIW link is suspended, all the processors in the chain will get suspended.

5. (Parallel Computing, Slave)

When one side of the IPSR register 2 shows this configuration (while the other side shows the Independent-Master case), the processor is in a Slave-Master relation with the processor on that side, on behalf of which it executes a task. The starting address of the task is passed to the processor when the Slave-Master relation has been established. At the end of the task, the processor executes an End-Of-Task instruction that gets locked in the corresponding status bits of the Master. When the End-Of-Task instruction is executed, the processor enters a state that is dependent on the status bits on the other side of the IPSR 2.

In this state, a processor has access to its own registers and data memory space and to the dual port memory window into the data space of the Master processor.

6. (Long Instruction Word, Slave)

When one side of the IPSR register shows this configuration, (while the other side shows the Independent-Master case), the processor is in a Slave-Master relation with the processor on that side. In this situation, the processor still has the ability to put itself into a Master situation with respect to the processor on the other side.

As mentioned before, when multiple processors run in a locked state, synchronism is essential. All processors should have the same master clock and they all should take (or not take) a conditional branch based on the decision of the Master processor. In this case, the Master drives the Jump interface line and all the Slaves in the chain execute a Branch on External Decision instruction that takes the jump based on the state of the line.

A processor locked in a Slave mode has access not only to its own registers and data memory space but to the register banks of the other neighboring processor it is running locked with and the dual port data memory windows into their data space.

7. (Suspended, Slave)

In this case the processor that was locked executes only an NOP instruction, freezes the Program Counter (PC), and waits for the Release signal.

The internal register access and structure of a central processor will now be described with reference to FIG. 4. Data memory data bus 20 is connected through multiplexers 21 to Left, Middle and Right registers 22, 23, 24 which in turn are connected through muliplexer 25 to processing unit 26 including the ALU/MAC, BS, and DAG. Because any processor in this architecture is interruptible, almost all internal registers except for the IPSR 2 should be shadowed.

The MAC/ALU (Multiplier/Accumulator)architecture is shown in more detail in FIG. 6, in which for brevity only the input data flow is shown. The left DMD bus 40 is connected through the interface to a corresponding bus in the left processor 8. In operation, data flows from the left hand processor through MUX 22 to registers ALH, ALL (Accumulator Left High, Accumulator Right Low) from where it passes through Mux 23 to Multiplier and Accumulator and logic circuit 24, which is connected to the right barrel shifter 25. Similarly, data from the right processor 7 arrives over the right DMD bus 26 and passes through Mux 27, registers ARH, ARL, and Mux 28 to MAC unit 24. Internal register bus 29 is connected through Mux units 30, 31, 32, 33 to pairs of registers ALH, ALL; ARH, ARL; AAH, AAL; ABH, ABL connected through Mux 34 and left barrel shift register to MAC unit 24. It will be apparent that this arrangement allows instruction words to be shared between the adjacent processors.

When a processor becomes slave to another processor, it uses the shadow registers to preserve the last contents of its registers as a Master. The shadow registers are back-propagated to the main registers when the processor re-enters a master mode (with respect to both left and right processor).

Figure 4:
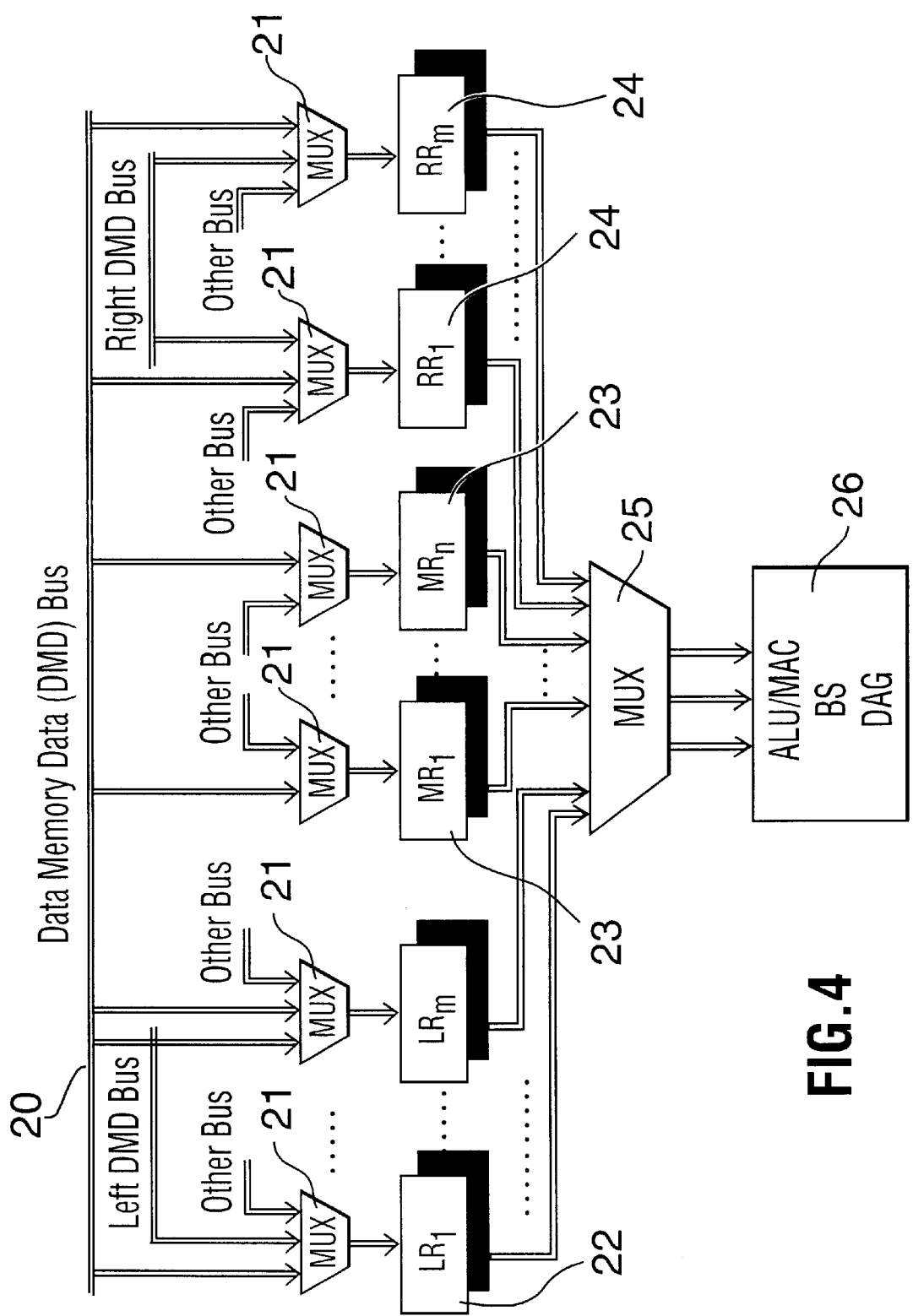
FIG. 4 shows the internal registers and bus structure of a processor in accordance with the invention.

For all three computational units (ALU, MAC and BS) a register relationship as presented in FIG. 4 is valid.

The ALU and the MAC require two operands (usually) while the BS requires only 1. Depending on the architecture, the DAG requires 1 to 3 input registers. The set of registers available to a computational block is symmetrically divided into three groups, namely a set of n registers that can be loaded from their own DMD bus or some other local bus, and two sets/banks of m registers that can be accessed not only from the local buses but from the adjacent (left or right) processors.

The access to an internal register from the left or the right processor, in a symmetrical arrangement, is a significant aspect of the present invention. This change facilitates the taking advantage of the Large Instruction Word functional state. When one DSP can perform an operation on the already existent registers, the neighboring DSPs can use the additional buses to read/write access other internal registers. The dual port memory is 3 used in this case to enhance the access of the neighboring DSPs to the data space of the middle processor.

The m and n values should be relatively small (1 and 2 in one embodiment) because otherwise the propagation delays through various levels of multiplexing could add up to significant values. The totality of all registers accessible from the left (or right) processor forms the bank of registers used for communicating with the left (or right) processor.

Because of the symmetry of the register distribution, similar banks of registers are available in the left and right processor, and as such, in any two processor LIW interaction two banks of registers will be always available for communication and speeding up each others computations when needed.

The instruction set of a processor will be enhanced with instructions capable of addressing the left or right processor. These instructions are operational and useful only when a processor functions locked with another processor (in LIW state).

Tables 4 to 19 present the state and mode transition. It should be noted that due to the symmetrical properties of the architecture, the cases that are not covered can be derived from those that are given.

TABLE 4

Initial status bits Left: Indep Master Right: Indep Master

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Int.: force Right to PC | Indep. | Master | PC | Master | Saved | PC | Master | PC | Master |
| Int.: force Right to LIW | Indep. | Master | LIW | Master | Saved | LIW | Master | LIW | Master |
| Right: Enter PC | Indep. | Master | PC | Slave | Saved | PC | Slave | PC | Slave |
| Right: Enter LIW | Indep. | Master | LIW | Slave | Saved | LIW | Slave | LIW | Slave |

TABLE 5

Initial status bits Left: Indep. Master Right: PC Master

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Int.: force Right to PC | PC | Master | PC | Master | Saved | PC | Master | PC | Master |
| Int.: force Left to LIW | LIW | Master | PC | Master | Saved | LIW | Master | LIW | Master |
| Right: task completed | Indep. | Master | Indep. | Master | Saved | Indep. | Master | Indep. | Master |

TABLE 5-continued

Initial status bits Left: Indep. Master Right: PC Master

| Action | Left status bits | | Right status bits | | Regs | Left state lines | | Right state lines | |
|---|---|---|---|---|---|---|---|---|---|
| | State | Mode | State | Mode | state | State | Mode | State | Mode |
| Left: Enter PC | PC | Slave | PC | Master | Saved PC | Slave | | PC | Slave |
| Left: Enter LIW | LIW | Slave | PC | Master | Saved LIW | Slave | | LIW | Slave |

TABLE 6

Initial status bits Left: Indep. Master Right: PC Slave

| Action | Left status bits | | Right status bits | | Regs | Left state lines | | Right state lines | |
|---|---|---|---|---|---|---|---|---|---|
| | State | Mode | State | Mode | state | State | Mode | State | Mode |
| Int.: force Left to LIW | LIW | Master | PC | Slave | Saved LIW | Slave | | LIW | Slave |
| Int.: force Left to PC | PC | Master | PC | Slave | Saved PC | Slave | | PC | Slave |
| Int.: task completed | Indep. | Master | Indep. | Master | Saved Indep. | Master | | Indep. | Master |

TABLE 7

Initial status bits Left: Indep Master Right: LIW Master

| Action | Left status bits | | Right status bits | | Regs | Left state lines | | Right state lines | |
|---|---|---|---|---|---|---|---|---|---|
| | State | Mode | State | Mode | state | State | Mode | State | Mode |
| Int.: force Left to LIW | LIW | Master | LIW | Master | Saved LIW | Master | | LIW | Master |
| Int.: force Left to PC | PC | Master | LIW | Master | Saved PC | Master | | LIW | Master |
| Right: exit LIW | Indep. | Master | Indep. | Master | Saved Indep. | Master | | Indep. | Master |
| Left: enter PC | PC | Slave | Susp. | Master | Saved PC | Slave | | Susp. | Slave |

TABLE 8

Initial status bits Left: Indep Master Right: LIW Slave

| Action | Left status bits | | Right status bits | | Regs | Left state lines | | Right state lines | |
|---|---|---|---|---|---|---|---|---|---|
| | State | Mode | State | Mode | state | State | Mode | State | Mode |
| Int.: force Left to LIW | LIW | Master | LIW | Slave | Saved LIW | Slave | | LIW | Slave |
| Int.: force Left to PC | PC | Master | LIW | Slave | Saved LIW | Slave | | LIW | Slave |
| Right: exit LIW | Indep. | Master | Indep. | Master | Saved Indep. | Master | | Indep. | Master |
| Right: suspend | Indep. | Master | Susp. | Slave | Saved Susp. | Slave | | Susp. | Slave |

TABLE 9

Initial status bits Left: Independent Master Right: Suspend Slave

| Action | Left status bits | | Right status bits | | Regs | Left state lines | | Right state lines | |
|---|---|---|---|---|---|---|---|---|---|
| | State | Mode | State | Mode | state | State | Mode | State | Mode |
| Right: exit Suspend | Indep. | Master | LIW. | Slave | Saved LIW. | Slave | | LIW. | Slave |

TABLE 10

Initial status bits Left: PC Master Right: PC Master

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Left: task completed | Indep. | Master | PC | Master | Saved | PC | Master | PC | Master |
| Right: task completed | PC | Master | Indep. | Master | Saved | PC | Master | PC | Master |

TABLE 11

Initial status bits Left: PC Master Right: PC Slave

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Left: task completed | Indep. | Master | PC | Slave | Saved | PC | Master | PC | Slave |
| Int.: task completed | PC | Master | Indep. | Master | Saved | PC | Master | PC | Master |

TABLE 12

Initial status bits Left: PC Master Right: LIW Master

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Left: task completed | Indep. | Master | LIW | Master | Saved | LIW | Master | LIW | Master |
| Int.: exit LIW (unlock) | PC | Master | Indep. | Master | Saved | PC | Master | PC | Master |

TABLE 13

Initial status bits Left: PC Master Right: LIW Slave

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Left: task completed | Indep. | Master | LIW | Slave | Saved | LIW. | Slave | LIW. | Slave |
| Right suspend | PC | Master | Susp. | Slave | Saved | Susp. | Slave | Susp. | Slave |
| Right exit LIW | PC | Master | Indep. | Master | Saved | PC | Master | PC | Master |

TABLE 14

Initial status bits Left: PC Master Right: Suspend Slave

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Right: exit Suspend | PC | Master | LIW | Slave | Saved | LIW | Slave | LIW | Slave |
| Left: task completed | Indep. | Master | Susp. | Slave | Saved | Susp. | Slave | Susp. | Slave |

TABLE 15

Initial status bits Left: PC Slave Right: LIW Master

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Int.: task completed | Indep. | Master | Indep. | Master | Saved | Indep. | Master | Indep. | Master |
| Int.: exit LIW unlock | PC | Slave | Indep. | Master | Saved | PC | Slave | PC | Slave |

TABLE 16

Initial status bits Left: LIW Master Right: LIW Master

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Int.: task completed | Indep. | Master | LIW | Master | Saved | LIW | Master | LIW | Master |

TABLE 17

Initial status bits Left: LIW Master Right: LIW Slave

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Int.: exit LIW Left | Indep. | Master | LIW | Master | Saved | LIW. | Master | LIW. | Master |
| Int.: exit LIW Right | LIW | Master | Indep. | Master | Saved | LIW | Master | LIW | Master |

TABLE 18

Initial status bits Left: LIW Master Right: LIW Slave

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Int.: exit LIW Left | Indep. | Master | LIW. | Slave | Saved | LIW. | Slave | LIW. | Slave |
| Right: exit LIW | Indep. | Master | Indep. | Master | Saved | Indep. | Master | Indep. | Master |
| Right: suspend | Susp. | Slave | Susp. | Master | Saved | Susp. | Slave | Susp. | Slave |

TABLE 19

Initial status bits Left: Suspend Master Right: Suspend Slave

| | Left status bits | | Right status bits | | Regs | Left state lines | | Right state lines | |
|---|---|---|---|---|---|---|---|---|---|
| Action | State | Mode | State | Mode | state | State | Mode | State | Mode |
| Right: exit Suspend | LIW | Master | LIW | Slave | Saved | LIW | Slave | LIW | Slave |

The following table present all the software commands required to perform the various actions described in the previous tables.

TABLE 20

| Command | | Description |
|---|---|---|
| XTR | address | execute Task starting at 'address' on Right processor |
| XTL | address | execute Task starting at 'address' on Left processor |
| LCKR | address | LoCK Right processor (force right to LIW state) starting at 'address' |
| LCKL | address | LoCK Left processor (force left to LIW state) starting at 'address' |
| EOT | | End Of Task (reported to the processor on the slave side) |
| RELR | | RELease (unlock) Right processor |
| RELL | | RELease (unlock) Left processor |
| BED | address | Branch on External Decision |
| WTCL | | Wait for Task Completed on Left processor |
| WTCR | | Wait for Task Completed on Right processor |

In one embodiment, the first four instructions in Table 20 (XTR,XTL,LCKR,LCK1) are blocking. This ensures that if the processor they are trying to bring to a Master-Slave relation is in a state that does not permit the desired state transition, then the processor will enter a state where it will keep on trying to execute the mentioned instructions. In a different embodiment, these instructions can be made non blocking. In this situation, the program needs code that is compatible with a successful attempt and code that is compatible with a failed attempt.

Besides the specific instructions given in the table, some of the usual instructions of a DSP are extended to handle external register bank access rights.

The instructions XTR,XTL,LCKR,LCK require at least two cycles to execute. During the first cycle, the processor executing one of these instructions will try, based on its own status bits and other processor status lines, to force a neighboring processor into a Slave situation. If this attempt is successful, during the second cycle an address will be passed over the Data Bus lines to the other processor. In many cases, a third cycle is required for the second processor to fetch the instruction found at the address passed.

Figure 5:
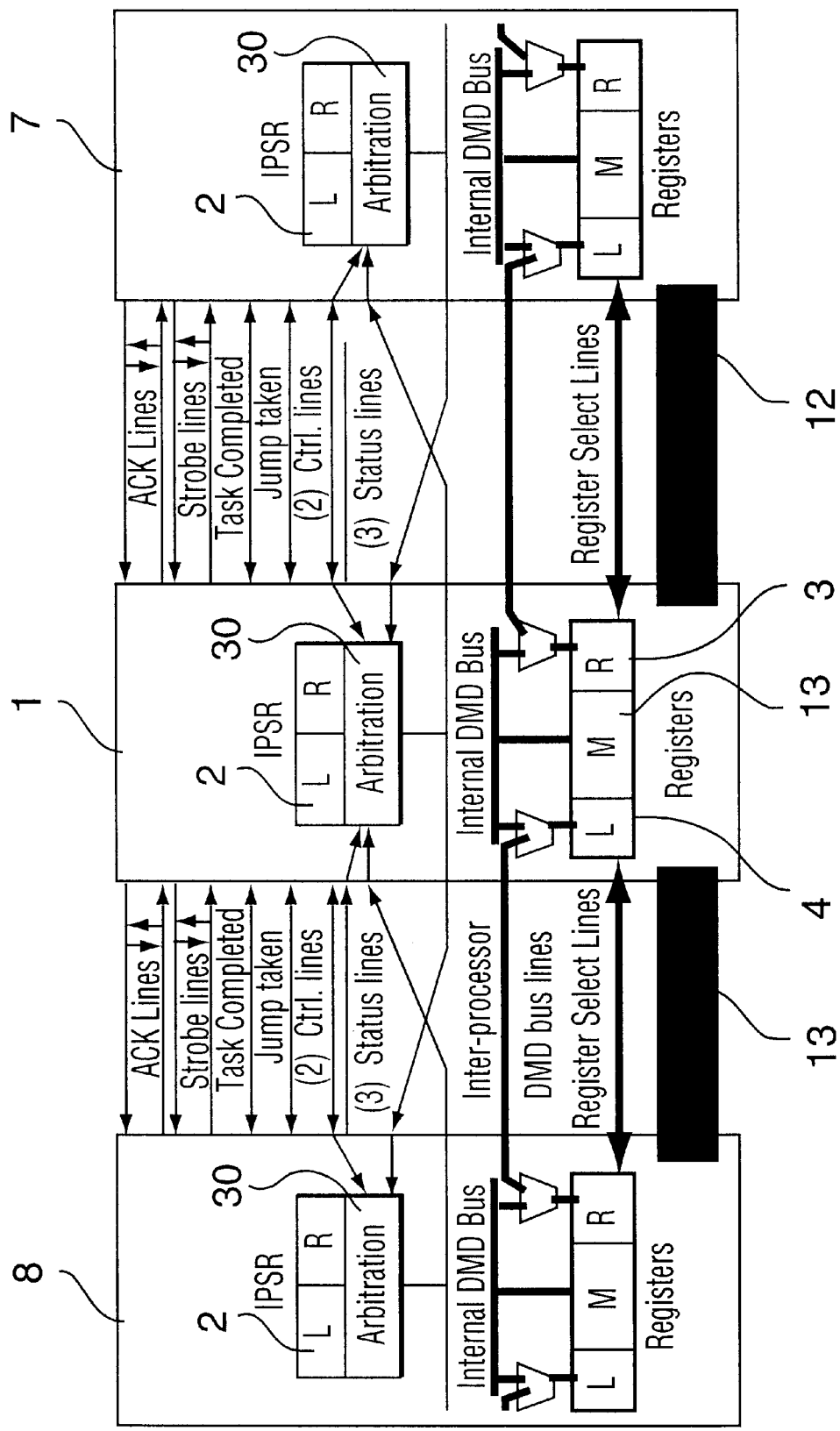
FIG. 5 illustrates conflict resolution in a multiple processor system.

A conflict arises when two processors attempt to put each other in a Master-Slave relation simultaneously. One solution to this situation is to always give priority to the processor on the right side of the couple. To solve this conflict, in one embodiment, an extra interface line is added (the ACKnowledgment line) and an Arbitration block that is biased to the right. This arrangement is shown in FIG. 5, where central processor 1 is shown connected to Right and Left processors 7, 8. The IPSR 2 of each processor has an arbitration block 30.

Where the software can guarantee that such conflicts do not occur, the Arbitration block and the additional interface line are not required.

The present invention thus offers a powerful technique for evenly distributing the processing power of complex applications over multiple DSPs, using Parallel Computing and Large Instruction Word methods, which can be of variable length.

Because of the processing power and additional buses made available by multiple processors through this new distributed architecture method, it can be used with slower master clocks or slower memories.

The new distributed architecture is particularly suited for the case where the processors are sharing the silicon space of the same integrated circuit.

Due to its symmetrical properties, the distributed architecture can be easily scaled up to provide the necessary computational power for very complex DSP tasks even at low master clock rates or slow memory access time.

We claim:

1. Digital processing apparatus comprising a microprocessor, said microprocessor comprising:
   a) at least one external interface for connection to a respective parallel like microprocessor having a similar interface to permit the exchange of data and control signals;
   b) a plurality of internal registers including a respective internal register jointly accessible from each said parallel like microprocessor, an internal bus accessing said internal registers, and an inter-processor bus connectable to each said parallel like microprocessor through said at least one external interface;
   c) a multiplexer connecting said internal bus and the or each said inter-processor bus to the or each said jointly accessible internal register so that said microprocessor and the or each said external like microprocessor can co-operatively share in the execution of a single instruction represented by a large instruction word; and
   d) an inter-processor status register for maintaining the current status of said microprocessor and said least one parallel like microprocessor.

2. Digital processing apparatus as claimed in claim 1, comprising a pair of said external interfaces for connection to respective like microprocessors in a symmetrical arrangement.

3. Digital processing apparatus as claimed in claim 1, wherein said microprocessor includes dual-ported memory that can be a mapped into data memory space of said microprocessor and an adjacent said parallel microprocessor to provide a window between said adjacent microprocessors.

4. Digital processing apparatus as claimed in claim 1, wherein said at least one external interface includes control and status lines, data bus lines, and register select lines.

5. Digital processing apparatus as claimed in claim 1, wherein said inter-processor status register includes for each like said parallel microprocessor a memory cell storing the processing state of the processor, the memory cell storing the current mode of operation, and a memory cell storing the state of completion of a current task.

6. Digital processing apparatus as claimed in claim 1, wherein said at least one external interface is operative to permit the exchange control and data signals to permit the parallel execution in each processor of sequences of separate instructions forming independent routines.

7. Digital processing apparatus as claimed in claim 1, wherein said at least one external interface includes a jump line to send a signal to the or each cooperating parallel microprocessor so that when said microprocessor encounters a jump instruction, the or each said like parallel microprocessor also execute a jump so as to make loop executions possible.

8. Digital processing apparatus as claimed in claim 7, wherein said microprocessor includes an arbitration unit and said at east one external interface includes an acknowledgment line to permit conflict resolution between cooperating microprocessors.

9. A distributed architecture parallel processing apparatus, comprising a microprocessor having at least one external interface connected to a similar interface of a neighboring like parallel microprocessor, said microprocessors exchanging data and control signals through said respective interfaces to cooperatively share in the execution of a program, each said microprocessor having an inter-processor status register for maintaining the current status of said microprocessors, a plurality of internal registers including a respective internal register jointly accessible from another said parallel like microprocessor, an internal bus accessing said internal registers, an inter-processor bus connectable to said another like microprocessor through said external interface, and a multiplexer connecting said internal bus and said inter-processor bus to said jointly accessible internal register so that said microprocessor and said another like microprocessor can co-operatively share in the execution of a single instruction represented by a large instruction word.

10. A distributed architecture parallel processing apparatus as claimed in claim 9, wherein adjacent said microprocessors include dual-ported memory to share a common address space mapped to each processor so as to provide memory window therebetween.

11. A distributed architecture parallel processing apparatus as claimed in claim 9, wherein said at least one external interface includes control and status lines, and data bus lines.

12. A distributed architecture parallel processing apparatus as claimed in claim 11, wherein said at least one external interface further includes a jump line for sending a signal to an adjacent cooperating parallel microprocessor so that when a master processor encounters a jump instruction, the or each cooperating parallel microprocessor will jump in synchronism to permit assisted loop executions.

13. A distributed architecture parallel processing apparatus as claimed in claim 11, wherein said microprocessors include an arbitration unit and said at least one external interface further includes an acknowledgment line so as to permit conflict resolution between cooperating processors.

14. A distributed architecture parallel processing apparatus as claimed in claim 11, wherein any of said microprocessors can be in a master mode and any of the remaining microprocessors can be in a slave mode relative to said microprocessor in the master mode.

15. A distributed architecture parallel processing apparatus as claimed in claim 14, wherein said microprocessors are provided on a common integrated circuit.

16. A distributed architecture parallel processing apparatus as claimed in claim 15, wherein said microprocessors include internal registers that are shadowed, and when a master processor becomes a slave to another processor the last contents of the register in the master mode are preserved in shadow memory.

17. A method of executing a program comprising the steps of:
- a) providing at least two parallel processors;
- b) interconnecting said processors through an external interface so that they can exchange data and control signals to cooperatively share in the execution of a program;
- c) providing internal registers in each said processor, at least one said register being jointly accessible with a said parallel processor;
- d) providing in each said processor an internal bus and an interprocessor bus connected to a said parallel processor through said interface;
- e) permitting two said processors to access said jointly accessible register by multiplexing said internal and inter-processor buses so that said parallel processors can co-operatively share in the execution of a single instruction represented by a large instruction word; and
- f) maintaining the status of the cooperating processors in a inter-processor status register provided therein.

18. A method as claimed in claim 17, wherein the the cooperating parallel processors are arranged in a symmetrical arrangement.

19. A method as claimed in claim 17, wherein said cooperating processors are further capable of sharing the execution of a program task, each executing an independent sequence of program instructions.

20. A method as claimed in claim 17, wherein neighboring said processors share a common address space through a dual-ported memory.

21. A method as claimed in claim 17, wherein one of said processors serves as a master and the or each parallel processor serves is a slave.

22. A method as claimed in claim 21, wherein said processors are synchronized over a jump line through said interface so that when the master executes a program jump, the or each slave processor executes a program jump in synchronism therewith to permit assisted loop executions.

23. A distributed architecture parallel processing apparatus as claimed in claim 15, wherein said microprocessors are arranged in a symmetrical arrangement with one central microprocessor and at least one parallel microprocessor on either side thereof.

* * * * *